H. H. STEELE.
TYPE WRITING MACHINE.
APPLICATION FILED MAR. 9, 1907.
921,303.
Patented May 11, 1909.
6 SHEETS—SHEET 1.
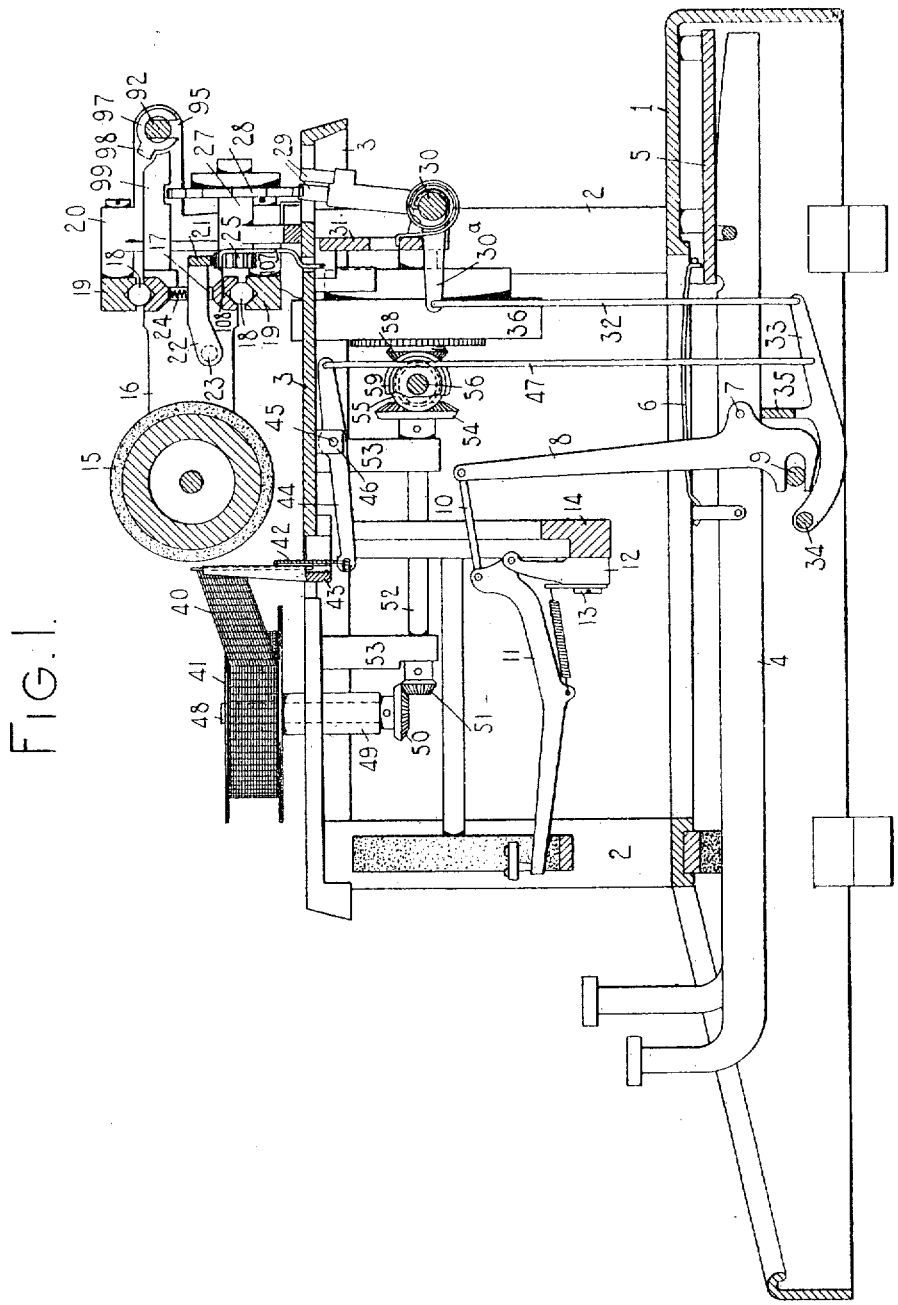
FIG. I.
WITNESSES.
J. B. Reeves.
M. W. Pool
INVENTOR.
Herbert H. Steele
By Jacob Felbel
HIS ATTORNEY

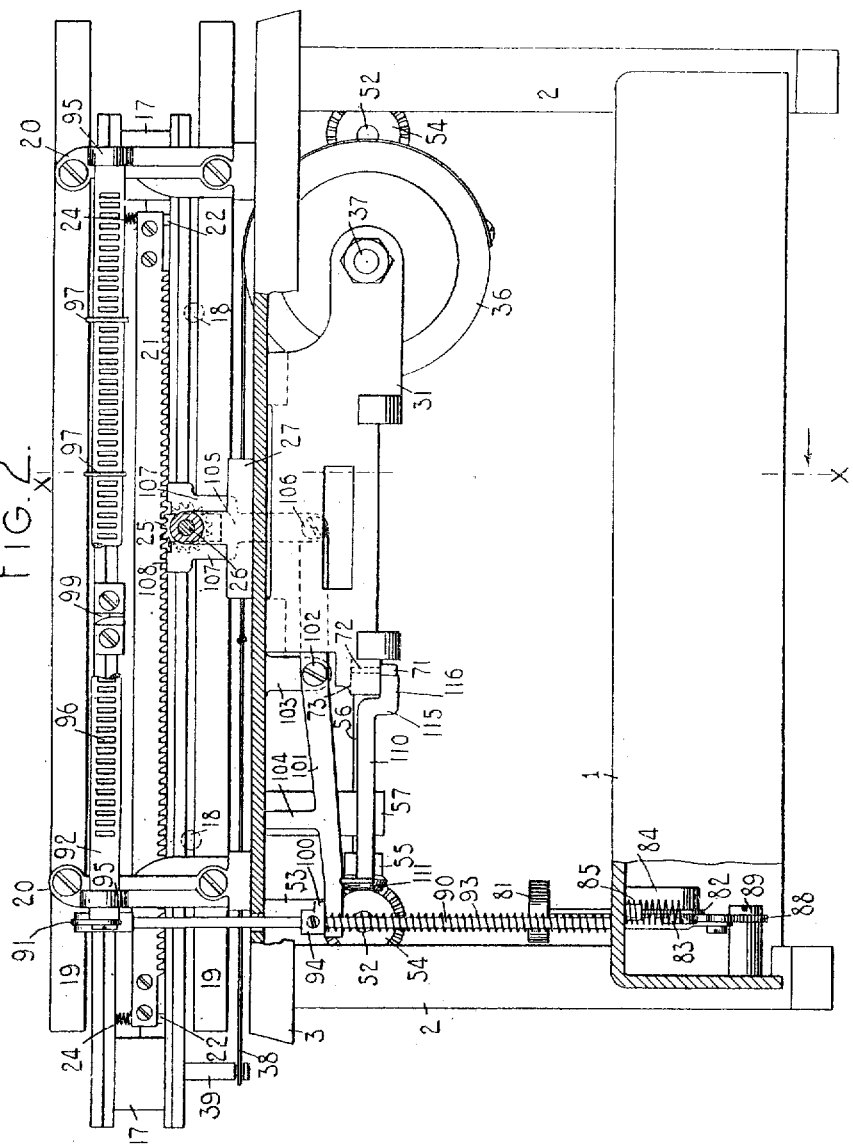

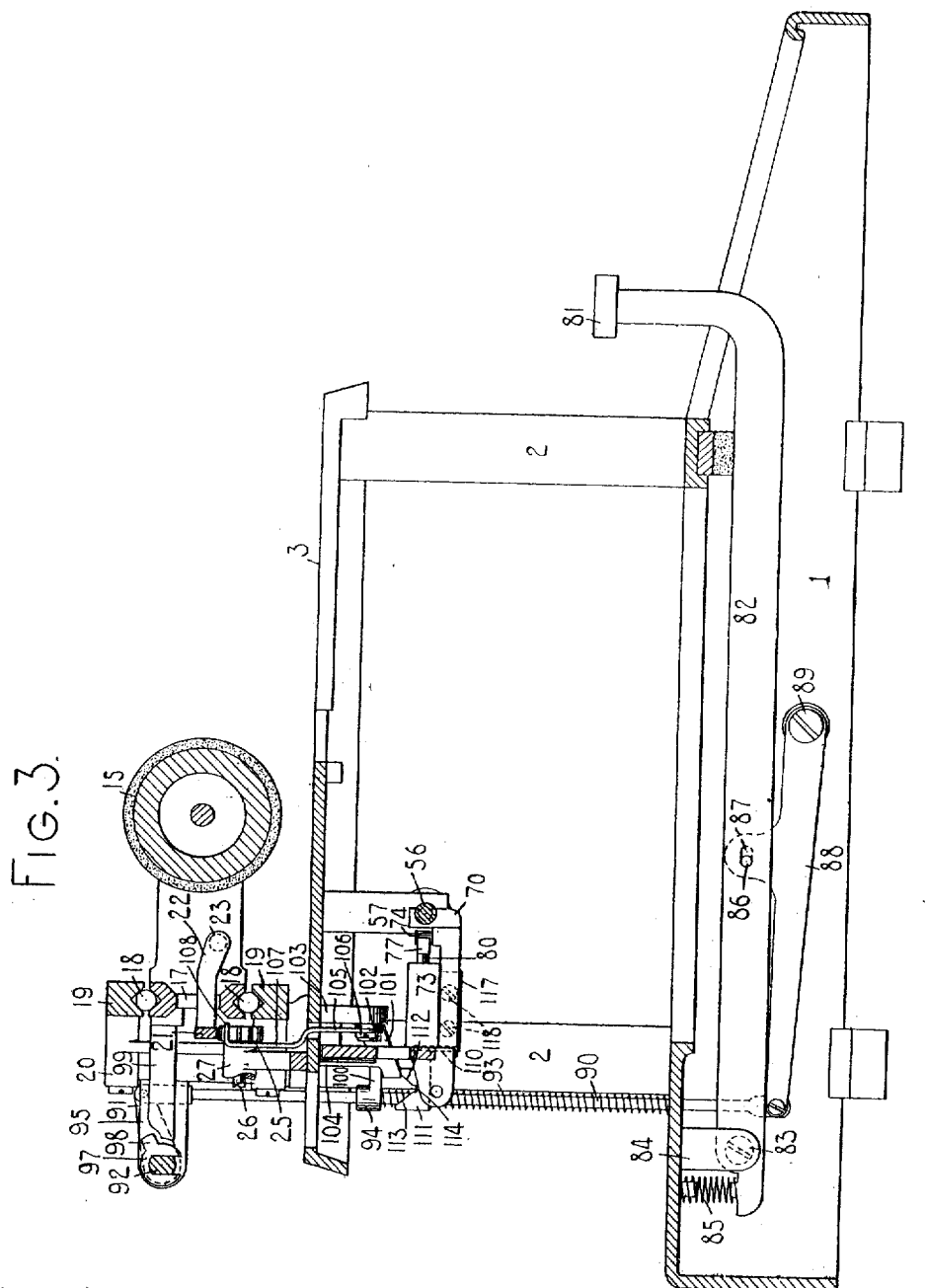

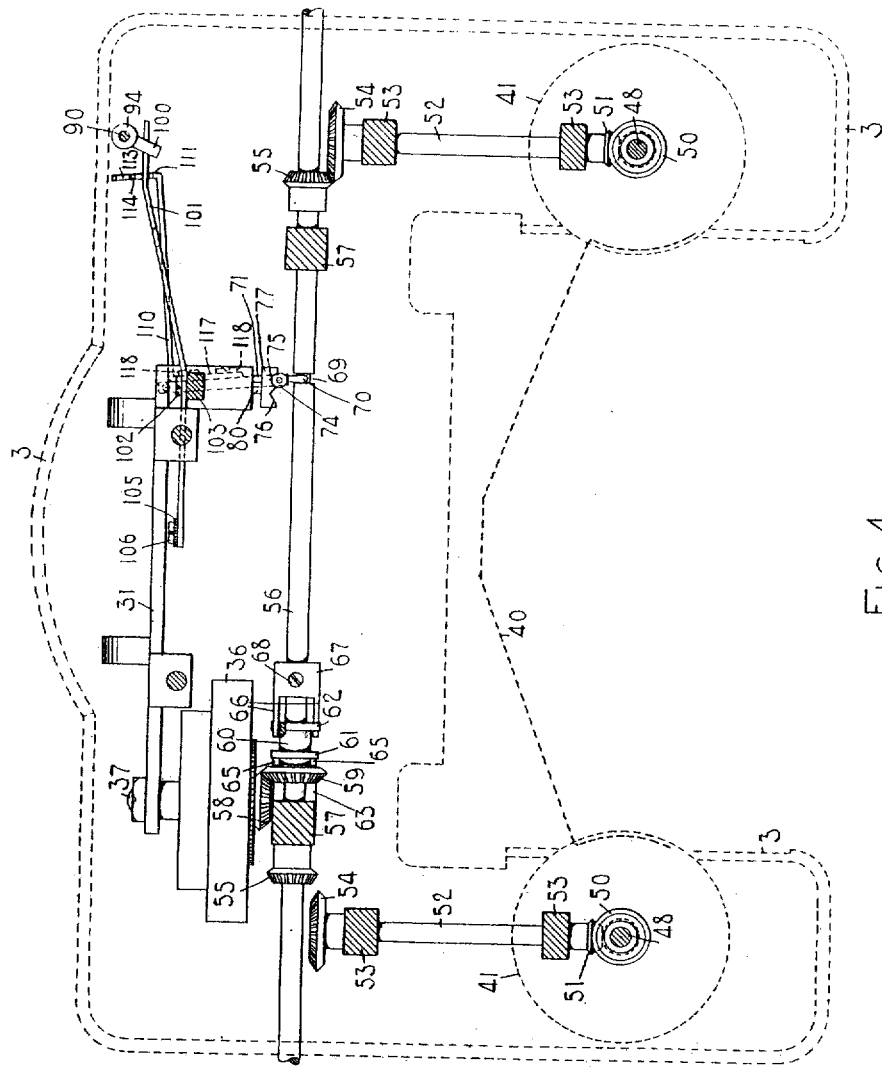

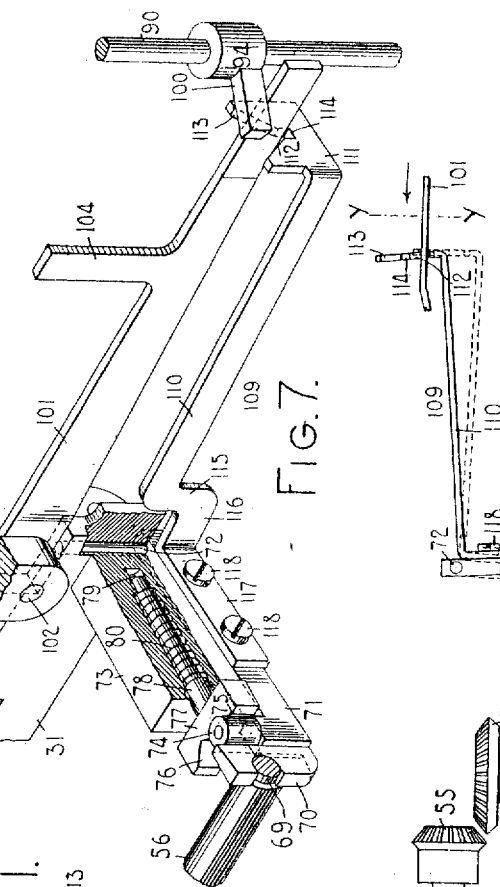

H. H. STEELE.
TYPE WRITING MACHINE.
APPLICATION FILED MAR. 9, 1907.
921,303.
Patented May 11, 1909.
6 SHEETS—SHEET 6.
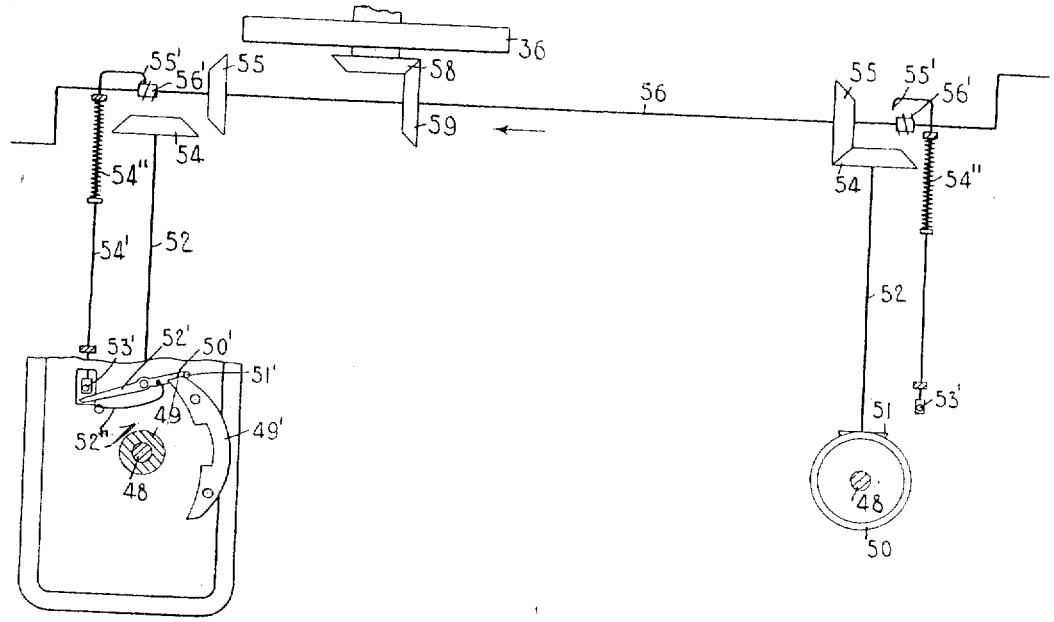
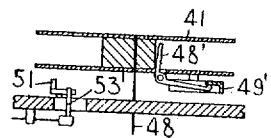
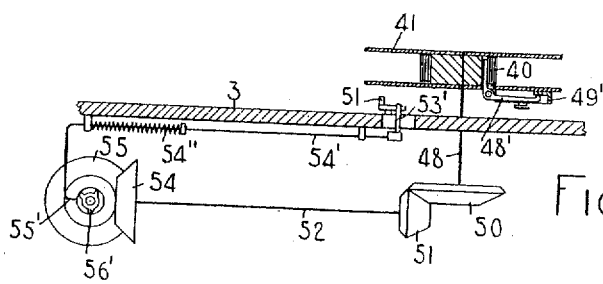
WITNESSES:
J. B. Dewes.
M. W. Pool
INVENTOR.
Herbert H Steele
By Jacob Felbel
HIS ATTORNEY

UNITED STATES PATENT OFFICE.

HERBERT H. STEELE, OF SYRACUSE, NEW YORK, ASSIGNOR TO THE MONARCH TYPEWRITER COMPANY, OF SYRACUSE, NEW YORK, A CORPORATION OF NEW YORK.

TYPE-WRITING MACHINE.

No. 921,303.  Specification of Letters Patent.  Patented May 11, 1909.

Application filed March 9, 1907. Serial No. 361,432.

*To all whom it may concern:*

Be it known that I, HERBERT H. STEELE, citizen of the United States, and resident of Syracuse, in the county of Onondaga and State of New York, have invented certain new and useful Improvements in Type-Writing Machines, of which the following is a specification.

My invention relates to ribbon feeding mechanism of that class of typewriting machines wherein the ribbon has connections with the means for driving or impelling the carriage. In machines of this class whenever the carriage is freed or released from its escapement devices either by actuating a tabulator key or otherwise, and is drawn varying distances by the carriage impelling device (usually a spring drum), the ribbon, which has connections with the carriage impelling device will usually be fed corresponding distances. During this feed of the ribbon the printing devices are inactive and consequently a portion or section of the ribbon will pass the printing point without receiving impressions from the types, this portion or section varying in length with the distance which the carriage "jumps" or is drawn continuously when released from the escapement devices. The result is that as the ribbon becomes more and more exhausted in use, these unused portions or sections of the ribbon will become more and more conspicuous in the printing executed by the machine, some of the characters being much darker than others and the typewriting consequently having an uneven, patchy appearance. Moreover, in machines of the character referred to and in which the direction of the longitudinal feed of the ribbon is automatically reversed, it sometimes happens that the end of the ribbon is reached during one of the "jumps" of the carriage, with the result that the rapid movement of the carriage prevents the effective working of the reversing mechanism and the feed of the ribbon is arrested or else the ribbon is jerked or torn from the empty spool.

The main object of the present invention is to overcome these and similar defects.

To the above and other ends the invention consists in the features of construction, combinations of devices and arrangements of parts hereinafter described and particularly pointed out in the claims.

My invention is shown as applied to a Monarch typewriting machine, but it is to be understood that said invention may be embodied in other forms of writing machines.

In the accompanying drawings, Figure 1 is a vertical front to rear sectional view taken about centrally of the typewriting machine and showing as much thereof as is necessary to a clear understanding of the invention. Fig. 2 is a rear elevation of the machine, parts being omitted and parts broken away. Fig. 3 is a sectional view taken on the plane represented by the line $x$—$x$ in Fig. 2. Fig. 4 is a sectional view taken on a plane passed horizontally through the machine beneath the top plate, parts being omitted and the top plate, ribbon spools and ribbon being indicated by dotted lines. Fig. 5 is an enlarged sectional view corresponding with Fig. 4 but omitting some of the parts shown in said Fig. 4. Fig. 6 is a sectional view corresponding with Fig. 5, some of the parts being shown in different relations from those in which they appear in said Fig. 5, and other parts shown in the latter figure being omitted. Fig. 7 is an enlarged perspective view of the disconnecting mechanism and the parts with which it directly coöperates, parts being broken away to more clearly show certain features. Figs. 8, 9, 10 and 11 are enlarged diagrammatic views taken on the plane represented by the line $y$—$y$ of Fig. 5 and looking in the direction of the arrows at said line, the said views showing different positions of two coöperative parts hereinafter referred to as a releasing lever and a disconnecting or shifting member. Figs. 12 and 13 are views showing in top plan and on an enlarged scale, different positions of the spring plunger and detent which aid in positioning the ribbon driving shaft. Fig. 14 is a diagrammatic top plan view of the ribbon feeding and ribbon reversing mechanisms. Figs. 15 and 16 are diagrammatic vertical sectional views further illustrating the ribbon feeding and ribbon reversing mechanisms.

Referring first to Figs. 1 to 3 inclusive of the drawings, the main frame of the machine is shown as comprising a base 1, corner posts 2 and a top plate 3. Key levers 4 are fulcrumed on a fulcrum plate 5 in the rear of the base, each key lever being provided with a restoring spring 6 and having pivoted to it at 7 a sub-lever 8, the lower arm whereof coöperates with a fixed abutment 9 and the upper end whereof is connected by a link 10 with a type bar 11 pivoted in a hanger 12 secured by a headed screw 13 to a segmental type bar support 14. The type bars are arranged in segmental series and when the actuating mechanism just briefly described is operated the types on said type bars coöperate with the front face of a rotary platen 15 mounted in a platen carrier or carriage comprising side bars 16 and a rear bar 17, the latter being provided with oppositely disposed grooved ways at its top and bottom which receive anti-friction balls 18, the latter also coöperating with grooved guide rails 19 fixed to standards 20 rising from the top plate 3.

A carriage feed rack 21 is secured at the free ends of rearwardly extending arms 22, the latter being pivoted at 23 to the side bars 16 of the platen carriage. A spring 24, like that shown or of any other suitable construction, may be employed to maintain the feed rack normally in engagement with a feed pinion 25 fixed to the forward end of a short shaft 26 bearing in a bracket 27 fixed to the top plate. A toothed escapement wheel 28 is operatively connected with the rear end of the shaft 26 and coöperates with escapement dogs 29 mounted on a dog carrier or rocker 30 which is pivoted on a bracket 31 secured to and depending from the top plate. The rocker 30 has a horizontally disposed arm 30ᵃ which is connected by a link 32 with an arm 33 of a universal bar frame, which latter comprises also a rock shaft 34 and a universal bar proper 35, the latter extending from side to side of the machine beneath the key levers. A carriage impelling device or spring drum 36 is rotatably mounted on a stud 37 secured to the bracket 31 and is connected by a band or strap 38 with a pin 39 depending from the rear bar of the carriage. Acting through the strap 38, the spring drum tends constantly to draw the carriage leftward across the top plate and when any key lever 4 or the space bar (not shown) is operated, the universal bar 35 is actuated, causing the escapement devices above described to coöperate in a known manner to permit the carriage to be drawn a letter space distance toward the left by the spring drum.

An ink ribbon 40 is wound upon, and has its ends attached to, ribbon spools 41 mounted above the top plate one at each side of the machine and forward of the platen. In passing from one spool to the other the ribbon coöperates with a ribbon carrier or vibrator 42 which is arranged centrally of the machine and is supported on a guide bracket 43 fixed to the top plate. The lower end of the ribbon carrier 42 is pivotally connected with the forward arm of a horizontally disposed operating lever 44 fulcrumed at 45 in a lug 46 depending from the top plate, the rear arm of said operating lever being connected by a link 47 with the arm 33 of the universal bar frame. The construction is such that when the universal bar is operated the vibrator 42 is caused to move upwardly to interpose the ribbon between the platen and the type on the actuated type bar. Each ribbon spool 41 is suitably secured at the top of a vertically disposed shaft 48 having a fixed bearing 49. Fixed to the lower end of each vertical shaft 48 is a small beveled gear 50 which meshes with a beveled pinion 51 fixed at the forward end of a horizontal and rearwardly extending shaft 52 having bearings in lugs 53 depending from the top plate. Fixed to the rear end of each shaft 52 is a beveled pinion 54 and adapted to coöperate therewith is a beveled driving pinion 55 which is fixedly secured on a driving or power shaft 56, said shaft, as best shown in Fig. 4, extending from side to side of the machine beneath the top plate and being slidably mounted in fixed bearing lugs 57 depending from the top plate. Mounted in front of and co-axially with the spring drum 36 is a beveled pinion 58 which is adapted to be turned with said spring drum during the left-hand rotations of the latter, the connection between the spring drum and the pinion 58 for effecting this result not being shown. The beveled pinion 58 meshes constantly with a beveled pinion 59 which is mounted on the driving shaft 56. The connection between the pinion 59 and the driving shaft 56 is best illustrated in Figs. 4 and 5 and may be briefly described. The pinion 59 has a rightward collar-like extension 60 provided with two flanges 61 and 62, the flange 61 being but a short distance from the pinion proper 59. An angled sheet-metal arm 63 is secured at one end to the bottom of the left-hand lug 57 by a headed screw 64, said arm at its inner end being bent upwardly at right angles and bifurcated to form a fork. The prongs 65 of the fork or bifurcated portion of the arm 63 loosely embrace the extension 60 between the flange 61 and the back of the pinion 59, the construction being such that while said pinion may turn freely it is prevented from moving lengthwise of the shaft 56 by the prongs 65. The flange 62 is formed with oppositely disposed notches which receive fingers 66 projecting leftward from a collar 67 secured by a headed screw 68 to the driving shaft 56. The collar 67 turns always with the driving shaft and through the fingers 66 causes the flange 62, as well as the extension 60 and pinion 59 to turn, while at the same time said fingers 66 may move lengthwise when the driving shaft is moved lengthwise without affecting the flange 62 or the pinion 59. It is not thought necessary to describe the connections of the pinions 58 and 59 with the spring drum and driving shaft at greater length as the connections shown do not differ essentially from those employed in the Monarch typewriter, and, as far as my invention is concerned, said connections may be of any suitable sort. It will be understood that rotary motion is communicated from the spring drum to the driving shaft 56 through the pinion 59 and that endwise to and fro movements of said driving shaft may be effected without affecting the pinion 59. It will further be understood that each ribbon spool 41 is connected through a train of mechanism, such as has been described, with a beveled pinion 54 and that the beveled driving pinions 55 are so arranged upon the driving shaft 56 that only one of said driving pinions is engaged at a time with its associate pinion 54. In order to cause the ribbon to wind from one spool to the other and vice versa the driving shaft may be moved back and forth endwise to effect the alternate engagement of the driving pinions 55 with their respective associate pinions 54. This endwise movement of the shaft 56 may be accomplished manually but it preferably is also effected automatically by any suitable means, such, for example, as that shown in the United States patent to Felbel and Gabrielson, No. 703,339, dated June 24th, 1902.

To avoid complicating the drawings the ribbon reversing mechanism of the patent above referred to has been illustrated separately from the other devices and will be found diagrammatically shown in Figs. 14, 15 and 16 which will now be briefly described, said patent being available for a fuller description. Referring to Figs. 14 to 16 inclusive, 48' designates an elbow lever pivoted to the under side of the left-hand ribbon spool 41 and retained for the greater part of the time in the position shown in Fig. 15 by folds of the ribbon 40, which with the driving shaft 56 positioned as shown in Fig. 14, is being wound off the left-hand spool and on the right-hand spool. Until the left-hand spool is emptied the horizontal arm of the elbow lever 48' serves to retain in inoperative position a cam plate 49' slidably secured to the under side of the spool 41. When the ribbon has been completely unwound from the spool it will release the upright arm of the elbow lever 48', thereby permitting the cam plate to drop vertically downward to the position shown in Fig. 16 in which position the cam surface 50' is adapted to engage with an upright pin 51' secured at one end of a horizontal spring-pressed lever 52' the other end whereof normally contacts with and presses rearwardly the upright arm 53' of a spring-pressed slide rod 54'. The rear end of said slide rod is bent laterally and forwardly, terminating in a trip pin 55' which normally is out of mesh with a worm 56' fixedly secured to the driving shaft 56. As the ribbon spool continues to rotate after the cam plate 49' has dropped to operative position, the cam face 50', acting upon the pin 51', cams the horizontal lever 52' against the pressure of its spring 52" to the position shown in Fig. 14, thereby allowing the slide rod 54' to be moved forward by its spring 54" until the trip pin 55' engages with the worm 56'. After this engagement takes place the driving shaft 56, as it is rotated during the letter space feeding movements of the carriage, will be wormed along in the direction of the arrow in Fig. 14 until the left-hand driving pinion 55 meshes with its associate pinion 54 and the corresponding right-hand pinions disengage, thereby reversing the direction of the longitudinal feeding movement of the ribbon. As the ribbon begins to wind back on the left-hand spool it will press the upright arm of the elbow lever 48' against the spool core, restoring said lever and with it the cam plate 49' to the position indicated in Fig. 15. When the cam plate 49' is moved upward it releases the horizontal lever 52', permitting the latter to again act upon the slide rod 54' to push said slide rod rearwardly and to restore the trip pin 55' to non-working position, the spring 52" being strong enough to overcome the spring 54". It will be understood that the right-hand ribbon spool is provided with a similar train of reversing mechanism which will operate in a manner similar to that just described when the right-hand spool is emptied of the ribbon.

The driving shaft 56 is provided with a circumferential groove 69 which is engaged by a notched extension 70 which, as clearly shown in Fig. 7, is formed at the forward end of a horizontally disposed detent arm 71, the latter at its rear end carrying an upwardly projecting pivot pin 72 which engages in a bearing block 73 extending horizontally forward from the bracket 31. The arm 71 also carries a detent roller 74 which coöperates with notches 75 and 76 formed in the head 77 of a slide member, the latter also comprising a stem or plunger portion 78 which is received in a hole 79 formed in the bearing block 73. A coiled spring 80 surrounds the stem of the slide member within the hole in the block 73 and tends to maintain the notched head 77 in engagement with the roller 74. The slide member and vibratory detent device or member above briefly described resemble in construction those employed in the Monarch machine and said slide and detent device are adapted to coöperate to complete the endwise movement of the driving shaft 56 in either direction and also to maintain said shaft in position after such endwise movement, substantially as set forth in the patent to Webb, No. 599,428, dated February 22nd, 1898. Some special functions of the detent device and slide member in the present case will be considered later on in connection with the operation of my improvements.

Figs. 1 to 4 inclusive clearly illustrate a tabulating mechanism in connection with which my invention is shown, said tabulating mechanism resembling generally that forming the subject-matter of the patent to Gabrielson, No. 784,317, dated March 7th, 1905. It is to be understood, however, that my invention may be used in connection with other styles of tabulating mechanism to automatically cut out or render inoperative the ribbon feeding devices. The tabulating mechanism shown is operated by a tabulating key 81 carried by a key lever 82 which is pivoted at 83 to a bracket 84 secured to the base of the machine, said key lever being provided with a restoring spring 85. The key lever 82 carries a laterally projecting pin 86 which extends into a slot 87 formed in a sub-lever 88, the latter being pivoted at 89 to a fixed part of the machine. The rear end of the sub-lever 88 is pivotally connected with an actuating link 90 which extends upwardly from the sub-lever through an opening in the top plate and is pivotally connected at its upper end with a crank arm 91, the latter being secured to the end of a rock shaft or oscillatory stop rod 92. A spring 93 surrounds the link 90 and, bearing at the lower end against the base of the machine and at the upper end against a collar 94 secured to the link 90, tends to restore the link and the parts connected thereto to normal position after operation. The stop rod or bar 92 extends in the direction of travel of the carriage and is supported in ears 95 projecting rearwardly from the standards 20. The stop rod 92 may be provided with a scale corresponding with the usual carriage scale and the front and back sides of the bar are serrated or notched as indicated at 96 to receive detachable and adjustable stop members 97 having forwardly and upwardly projecting stop lugs 98. Secured to the rear bar 17 of the carriage is a rearwardly projecting stop 99 which is adapted to coöperate with the stop lugs 98 of the stop members 97, said stop lugs, however, as shown in Figs. 1 and 3 being normally out of the path of movement of the carriage stop 99 and being moved into the path of said stop 99 when the key 81 is depressed. The collar 94 on the actuating link 90 is provided with an inwardly and forwardly extending abutment or finger 100 which co-acts with the outer end portion of the right-hand arm of a releasing lever 101 fulcrumed at 102 to a lug 103 depending from the top plate. The lever 101 is provided with an upwardly extending top portion 104 which contacts with the top plate to limit the upward motion of the right-hand arm of the lever. A forked rack lifter 105 is pivotally connected at 106 to the end portion of the inner or left-hand arm of the releasing lever 101. The rack lifter extends upwardly through an opening in the top plate and is bifurcated to provide arms 107 embracing loosely the bracket 27, said arms being bent horizontally forward near their upper ends to form lifting shoes 108, the latter lying beneath and normally out of contact with the teeth of the carriage rack 21. It will be understood that when the tabulating key 81 is operated it acts, through the sub-lever 88, link 90 and crank arm 91, on the stop bar 92, rocking the latter forwardly until the stop lugs 98 are in the path of the carriage stop 99. At the same time the finger 100 will depress the outer arm of the releasing lever 101 and lift the inner arm thereof, thereby raising the rack lifter and bringing the lifting shoes 108 into engagement with the carriage rack, the said lifting shoes swinging the latter upward out of engagement with the feed pinion 25, thus releasing or freeing the carriage from its escapement devices and permitting it to be drawn continuously and rapidly leftward by the carriage impelling means or spring drum.

As has been said, it is desirable, when the carriage is released from its escapement devices and is moved continuously a greater or less distance under the pull of the spring drum, to render the longitudinal ribbon feeding mechanism inoperative during such continuous movements of the carriage. In the present instance this disconnection of the ribbon is preferably accomplished by means comprising a disconnecting or releasing member which is illustrated in Figs. 2, 3, 4, 5 and 7, being most clearly shown in the last mentioned figure. The switching or disconnecting member is designated as a whole by the numeral 109 and is preferably formed of sheet metal cut out and bent to the desired shape. The member comprises a body portion 110 having at its outer or right-hand end a rearwardly bent extension 111, said extension underlying the right-hand arm of the lever 101 and being formed with oppositely disposed inclined faces 112 and 113 and a central dwell 114 which is somewhat wider than the thickness of the right-hand arm of the lever 101 near its outer end. The inner or left-hand end portion of the body 110 of the switching or disconnecting member 109 is bent downwardly at right angles as indicated at 115 to avoid the block or lug 73 and thence inwardly again or toward the left under the lug 73 as indicated at 116, the end of the part 116 being joined by an extension 117 extending forwardly lengthwise of the detent arm 71 and at right angles to the part 116 and to the body 110. Headed screws 118 pass through openings in the extension 117 and engage with threaded openings in the right-hand face of the detent arm 71, said screws thereby securing the number 109 fixedly to said detent arm. The member 109 is in effect a part of the vibratory detent member or device comprising the arm 71 and the extension 70, said member 109 being adapted to turn with said vibratory detent member on the pin 72 as a center and being connected by said vibratory detent member with the ribbon driving shaft 56.

The switching or disconnecting member 109 is adapted to be automatically operated by the releasing lever 101 when the tabulating key 81 is depressed, as will be more clearly understood from what follows. When the ribbon driving shaft 56 is positioned as shown in Figs. 4 and 5, the right-hand driving pinion 55 on said shaft will be engaged with its associate pinion 54 on the right-hand shaft 52 and during the letter space feeding movements of the carriage the ribbon will be wound on the right-hand ribbon spool and drawn off or unwound from the left-hand ribbon spool. At this time the detent arm 71 and the switching or disconnecting member 109 will be in the position shown in Figs. 4 and 5 and the extension 111 will be positioned relatively to the outer end portion of the right-hand arm of the releasing lever 101 as most clearly indicated in Fig. 8. With the parts thus positioned, if the tabulating key 81 be depressed it will operate as has been described to turn the column stops to operative position and to release or free the carriage from its escapement devices, this latter operation being effected through the releasing lever 101, the outer or right-hand arm whereof is depressed by the finger 100 and the left-hand arm whereof is raised about the fulcrum 102. As the right-hand arm of the lever 101 is depressed its end portion will engage with the inclined face 112 of the extension 111 of the member 109 and will force the body portion of said member forwardly, causing it to turn on the pin 72 as a center and also forcing the detent arm 71 leftwardly about this pin as a center. The rotary movements of the member 109 and the detent arm 71 about the pin 72 will continue until the end portion of the lever arm 101 reaches the bottom of the incline 112. As the detent arm 71 is swung leftward about the pin 72 under the action of the lever 101, the notched extension 70 engaging the left-side of the circumferential groove 69 in the driving shaft 56, will force said driving shaft longitudinally leftward, compressing the spring 80 and forcing the notched head rearwardly, the roller 74 riding leftward over the left-hand face of the notch 75 in said head 77. Further depression of the right-hand arm of the lever 101, after it reaches the bottom of the incline 112, seats it in the dwell 114, as shown in Fig. 9. The parts are so proportioned and arranged that when the lever arm reaches the end of the inclined face 112 and is seated in the dwell or depression 114, the driving shaft 56 will have been shifted to the position shown in Fig. 6, while the head 77 and its coöperative roller 74 will be in the relations shown in Fig. 12.

From a consideration of these last mentioned figures it will be noted that the leftward longitudinal movement of the driving shaft has been sufficient to disconnect the right-hand driving pinion 55 from its associate pinion 54, but has not been sufficient to cause an engagement between the left-hand driving pinion 55 with its associate pinion 54. In other words, the driving shaft has been shifted to an inoperative position so that it is entirely disconnected from the ribbon spools and neither of its pinions 55 is in operative engagement. As will be understood from a consideration of Fig. 12, the leftward movement of the detent arm 71 has not been sufficient to carry the roller 74 out of engagement with the notch 75, the result being that the pressure of the spring 80 is exerted through the cam plate 77 on the roller 74 and from it is transmitted through the arm 71 to the driving shaft 56 to restore said driving shaft to the position shown in Fig. 5 whenever pressure on the tabulating key 81 is removed. From what has been said it will be apparent that when the means for releasing the carriage from its escapement device is operated the ribbon and ribbon spools are automatically disconnected from the carriage impelling means and the longitudinal ribbon feeding mechanism is automatically rendered inoperative, and that, thereafter by means of the spring 80 said ribbon feeding means is again rendered operative automatically.

It will be understood that when the driving shaft 56 is moved endwise automatically to reverse the direction of longitudinal feed of the ribbon, causing the right-hand pinion 55 to become inoperative and moving the left-hand pinion 55 into engagement with its associate pinion 54, the detent and the shifting member 109 will be automatically rotated on the pin 72 to new positions, these positions being indicated by the dotted lines in Fig. 5. This results in a forward movement of the extension 111 of the member 109 and brings the inclined face 113 of said extension under the outer portion of the right arm of the lever 101 as illustrated in Fig. 10 and in the dotted line position of Fig. 5. From a consideration of these figures it will be understood that when the tabulating key is operated, the lever 101 will coöperate with the inclined face 113 to press the shifting or disconnecting member 109 rearwardly from the dotted line position of Fig. 5 and move the driving shaft 56 far enough toward the right to render the left-hand driving pinion 55 inoperative. This partial shifting movement of the driving shaft brings the slide plate 77 and the roller 74 into the relation shown in Fig. 13, from a consideration of which figure it will be apparent that when the tabulating key is released the spring 80 will then act to move the driving shaft 56 back toward the left and cause the left-hand driving pinion 55 to automatically reëngage with its associate pinion 54. It will be seen, therefore, that the automatic ribbon disconnecting means is operative in either of the longitudinal positions of the ribbon driving shaft as is the automatic reconnecting mechanism. The construction is such that when the tabulator key is depressed the driving shaft will be automatically disconnected from whichever one of the ribbon spools it happens to be connected with at the time; and when said key is released said shaft will be automatically connected again with the same spool. It will, of course, be understood that the automatic reverse can never be brought into operation during the time when the tabulator key is depressed because the spools are not rotating at that time. When the tabulator key is depressed the inclines 112 and 113 cause a rearward and forward pressure respectively on the lever 101. In order to prevent deflection of said lever suitable guides therefor may be provided if preferred.

Various changes may be made without departing from the spirit and scope of my invention.

What I claim as new and desire to secure by Letters Patent, is:—

1. In a typewriting machine, the combination of a carriage; means constantly tending to impel the carriage in one direction; carriage escapement devices; means for releasing the carriage from said escapement devices; ribbon-spools; connections independent of the escapement devices and of said carriage between the ribbon-spools and the carriage impelling means; and means for automatically disconnecting the ribbon-spools from the carriage-impelling means when the carriage is released by said releasing means.

2. In a typewriting machine, the combination of a carriage; means constantly tending to impel the carriage in one direction; carriage escapement devices; means for releasing the carriage from said escapement devices; ribbon feeding mechanism connected with said carriage-impelling means, said ribbon feeding mechanism being independent of the escapement devices and of the carriage; and means automatically operative when the carriage is released from its escapement devices to render the ribbon-feeding mechanism inoperative and thereafter automatically to render the ribbon-feeding mechanism again operative.

3. In a typewriting machine, the combination of a carriage; means constantly tending to impel the carriage in one direction; carriage escapement devices; means for releasing the carriage from said escapement devices; ribbon-spools; connections independent of the escapement devices and of said carriage between the ribbon-spools and the carriage-impelling means; and means for disconnecting the ribbon-spools from the carriage-impelling means, said disconnecting means being automatically actuated.

4. In a typewriting machine, the combination of a carriage; means constantly tending to impel the carriage in one direction; carriage escapement devices; means for releasing the carriage from said escapement devices; ribbon-spools; connections independent of the escapement devices and of said carriage between the ribbon-spools and the carriage-impelling means; and means for disconnecting the ribbon-spools from the carriage-impelling means, said disconnecting means being automatically actuated by the carriage-releasing means.

5. In a typewriting machine, the combination of a carriage; means constantly tending to impel the carriage in one direction; carriage escapement devices; means for releasing the carriage from said escapement devices; ribbon feeding mechanism connected with said carriage-impelling means, said ribbon-feeding mechanism being independent of the escapement devices; automatic means for reversing the ribbon-feeding mechanism; and automatic means for preventing the operation of said ribbon-reversing mechanism.

6. In a typewriting machine, the combination of a carriage; means constantly tending to impel the carriage in one direction; carriage escapement devices; means for separating the carriage from said escapement devices; ribbon-feeding mechanism connected with said carriage-impelling means and independent both of the escapement devices and of the carriage; automatic means for reversing the ribbon-feeding mechanism; and automatic means for preventing the operation of said ribbon-reversing mechanism.

7. In a typewriting machine, the combination of a carriage; carriage-impelling means; carriage escapement devices; a tabulating-key operative to separate the carriage from its escapement devices and to permit it to move freely to a predetermined point; ribbon-feeding mechanism connected with said carriage-impelling means; and means operative by said tabulating-key to render the ribbon-feeding mechanism inoperative.

8. In a typewriting machine, the combination of a carriage; carriage-impelling means; carriage escapement devices; a tabulating-key operative to separate the carriage from its escapement devices and to permit said carriage to move freely to a predetermined point; ribbon-feeding mechanism connected with said carriage-impelling means and independent of said escapement devices; and means operative by said tabulating-key to render the ribbon-feeding mechanism inoperative.

9. In a typewriting machine, the combination of a carriage; carriage-impelling means;

carriage escapement devices; connections between the carriage and its escapement devices; a tabulating-key operative to break the connection between the carriage and its escapement devices to permit said carriage to move freely to a predetermined point; ribbon-spools; connections between said ribbon-spools and said carriage-impelling means; and a switching member operative by said tabulating key to break the connection between said ribbon-spools and said carriage-impelling means.

10. In a typewriting machine, the combination of a carriage; carriage impelling means; carriage escapement devices; a tabulating key operative to separate the carriage from its escapement devices; ribbon spools; a ribbon driving shaft connected with said carriage impelling means; counter shafts operatively connected with the driving shaft and with the ribbon spools; and a switching member operative by said tabulating key to break the connection between said driving shaft and said counter shafts.

11. In a typewriting machine, the combination of a carriage; carriage-impelling means; carriage escapement devices; ribbon-spools; connections independent of said carriage between said ribbon-spools and said carriage-impelling means; key-operated means adapted to break the connection between said ribbon-spools and said carriage-impelling means; and means actuated by said key-operated means to free the carriage from the escapement devices.

12. In a typewriting machine, the combination of a carriage; means constantly tending to impel the carriage in one direction; carriage escapement devices; means for releasing the carriage from its escapement devices; ribbon spools; a ribbon driving shaft connected with said carriage-impelling means; and switching mechanism operative by the releasing means to shift said driving shaft so as to disconnect it from said ribbon spools.

13. In a typewriting machine, the combination of a carriage; means constantly tending to impel the carriage in one direction; carriage escapement devices; means for releasing the carriage from its escapement devices, said means including a releasing lever; ribbon spools; a ribbon driving shaft connected with said carriage-impelling means; and a switching member operative by the releasing lever to shift said driving shaft so as to disconnect it from said ribbon spools.

14. In a typewriting machine, the combination of a carriage; means constantly tending to impel the carriage in one direction; carriage escapement devices; means for releasing the carriage from its escapement devices, said means including a releasing lever; ribbon feeding mechanism including a driving shaft connected with said carriage-impelling means; and a switching member operative by said releasing lever to render said driving shaft inoperative to turn the ribbon spools.

15. In a typewriting machine, the combination of a carriage; means constantly tending to impel the carriage in one direction; carriage escapement devices; means for releasing the carriage from its escapement devices, said means including a releasing lever; ribbon feeding mechanism including a driving shaft connected with said carriage-impelling means; and a switching member operative by said releasing lever to shift the driving shaft, said switching member having two oppositely inclined faces with either of which said releasing lever is coöperative to switch said member a part only of the full movement of which it is capable.

16. In a typewriting machine, the combination of a carriage; carriage impelling means; carriage escapement devices; means for releasing the carriage from its escapement devices, said means including a releasing lever; ribbon feeding mechanism including a member shiftable to reverse the direction of feed of the ribbon; and a switching member operative by said releasing lever, the shiftable member having two inclined faces with either of which said releasing lever is coöperative to shift the shiftable member to an intermediate position when said ribbon feeding mechanism is inoperative to feed the ribbon in either direction.

17. In a typewriting machine, the combination of a carriage; feeding devices therefor; a pair of ribbon spools; a driving shaft shiftable endwise to gear it to one or the other of said spools; means for rotating said driving shaft to feed the ribbon; a key; and means operated by said key for shifting said driving shaft to an intermediate position in which it is inoperative to rotate either ribbon spool and for simultaneously releasing said carriage from said feeding devices.

18. In a typewriting machine, the combination of a carriage; means for impelling said carriage in one direction; a pair of ribbon spools; a driving shaft rotated by said carriage impelling means and shiftable to gear it to one or the other of said spools; tabulator mechanism including a tabulator key; and means operated by said tabulator key for shifting said shaft to an intermediate position in which it is inoperative to rotate either spool.

19. In a typewriting machine, the combination of a carriage; means for impelling said carriage in one direction; a pair of ribbon spools; a driving shaft rotated by said carriage impelling means and shiftable to gear it to one or the other of said spools; tabulator mechanism; means operated when said tabulator is brought into operation for shifting said shaft to an intermediate position in which it is inoperative to turn either spool; and means for automatically restoring said shaft to position to drive the same ribbon spool that it was disconnected from when the tabulator was brought into operation.

20. In a typewriting machine, the combination of a carriage; means constantly tending to impel the carriage in one direction; carriage escapement devices; means for releasing the carriage from said escapement devices; ribbon feed mechanism including means whereby either one of said ribbon spools is driven by said carriage impelling means; means for automatically disconnecting the connected ribbon spool from the carriage impelling means when the carriage is released by said releasing means; and means for automatically restoring the connection between said carriage impelling means and the same ribbon spool when the carriage is again connected with its escapement devices so that the direction of longitudinal feed of the ribbon is not reversed by the operation.

Signed at Syracuse, in the county of Onondaga, and State of New York, this 6th day of March A. D. 1907.

HERBERT H. STEELE.

Witnesses:
W. J. LOGAN,
JOHN S. MITCHELL.